US008788973B2

(12) United States Patent
Lavigne et al.

(10) Patent No.: US 8,788,973 B2
(45) Date of Patent: Jul. 22, 2014

(54) THREE-DIMENSIONAL GESTURE CONTROLLED AVATAR CONFIGURATION INTERFACE

(75) Inventors: Charles Tremblay Lavigne, Vancouver (CA); Edward Chin, Vancouver (CA); Eddie Parker, Vancouver (CA)

(73) Assignee: Microsoft Corporation, Redmond, WA (US)

( * ) Notice: Subject to any disclaimer, the term of this patent is extended or adjusted under 35 U.S.C. 154(b) by 73 days.

(21) Appl. No.: 13/113,788

(22) Filed: May 23, 2011

(65) Prior Publication Data

US 2012/0304126 A1   Nov. 29, 2012

(51) Int. Cl.
*G06F 3/048* (2013.01)

(52) U.S. Cl.
USPC .......................................... 715/848; 715/852

(58) Field of Classification Search
USPC ................................................ 715/852, 848
See application file for complete search history.

(56) References Cited

U.S. PATENT DOCUMENTS

| | | | |
|---|---|---|---|
| 4,627,620 A | 12/1986 | Yang | |
| 4,630,910 A | 12/1986 | Ross et al. | |
| 4,645,458 A | 2/1987 | Williams | |
| 4,695,953 A | 9/1987 | Blair et al. | |
| 4,702,475 A | 10/1987 | Elstein et al. | |
| 4,711,543 A | 12/1987 | Blair et al. | |
| 4,751,642 A | 6/1988 | Silva et al. | |
| 4,796,997 A | 1/1989 | Svetkoff et al. | |
| 4,809,065 A | 2/1989 | Harris et al. | |
| 4,817,950 A | 4/1989 | Goo | |
| 4,843,568 A | 6/1989 | Krueger et al. | |
| 4,893,183 A | 1/1990 | Nayar | |
| 4,901,362 A | 2/1990 | Terzian | |
| 4,925,189 A | 5/1990 | Braeunig | |

(Continued)

FOREIGN PATENT DOCUMENTS

| CN | 201254344 B | 6/2010 |
|---|---|---|
| EP | 0583061 A2 | 2/1994 |

(Continued)

OTHER PUBLICATIONS

Kanade et al., "A Stereo Machine for Video-rate Dense Depth Mapping and Its New Applications", IEEE Computer Society Conference on Computer Vision and Pattern Recognition, 1996, pp. 196-202,The Robotics Institute, Carnegie Mellon University, Pittsburgh, PA.

(Continued)

*Primary Examiner* — Andrea Leggett
(74) *Attorney, Agent, or Firm* — Judy Yee; Micky Minhas; Alleman Hall McCoy Russell & Tuttle LLP

(57) ABSTRACT

A method for controlling presentation to a user of a primary user experience of a software application is provided. The method includes displaying a third-person avatar in a 3D virtual scene that defines a user interface for controlling presentation of the primary user experience. The method further includes sensing controlling movements of the user within a physical space in which the user is located and causing display of controlled movements of the third-person avatar within the 3D virtual scene so that the controlled movements visually replicate the controlling movements. The method further includes detecting a predefined interaction of the third-person avatar with a user interface element displayed in the 3D virtual scene, and controlling presentation of the primary user experience in response to detecting the predefined interaction.

13 Claims, 5 Drawing Sheets

(56) References Cited

U.S. PATENT DOCUMENTS

| | | |
|---|---|---|
| 5,101,444 A | 3/1992 | Wilson et al. |
| 5,148,154 A | 9/1992 | MacKay et al. |
| 5,184,295 A | 2/1993 | Mann |
| 5,229,754 A | 7/1993 | Aoki et al. |
| 5,229,756 A | 7/1993 | Kosugi et al. |
| 5,239,463 A | 8/1993 | Blair et al. |
| 5,239,464 A | 8/1993 | Blair et al. |
| 5,288,078 A | 2/1994 | Capper et al. |
| 5,295,491 A | 3/1994 | Gevins |
| 5,320,538 A | 6/1994 | Baum |
| 5,347,306 A | 9/1994 | Nitta |
| 5,385,519 A | 1/1995 | Hsu et al. |
| 5,405,152 A | 4/1995 | Katanics et al. |
| 5,417,210 A | 5/1995 | Funda et al. |
| 5,423,554 A | 6/1995 | Davis |
| 5,454,043 A | 9/1995 | Freeman |
| 5,469,740 A | 11/1995 | French et al. |
| 5,495,576 A | 2/1996 | Ritchey |
| 5,516,105 A | 5/1996 | Eisenbrey et al. |
| 5,524,637 A | 6/1996 | Erickson |
| 5,534,917 A | 7/1996 | MacDougall |
| 5,563,988 A | 10/1996 | Maes et al. |
| 5,577,981 A | 11/1996 | Jarvik |
| 5,580,249 A | 12/1996 | Jacobsen et al. |
| 5,594,469 A | 1/1997 | Freeman et al. |
| 5,597,309 A | 1/1997 | Riess |
| 5,616,078 A | 4/1997 | Oh |
| 5,617,312 A | 4/1997 | Iura et al. |
| 5,638,300 A | 6/1997 | Johnson |
| 5,641,288 A | 6/1997 | Zaenglein |
| 5,682,196 A | 10/1997 | Freeman |
| 5,682,229 A | 10/1997 | Wangler |
| 5,690,582 A | 11/1997 | Ulrich et al. |
| 5,703,367 A | 12/1997 | Hashimoto et al. |
| 5,704,837 A | 1/1998 | Iwasaki et al. |
| 5,715,834 A | 2/1998 | Bergamasco et al. |
| 5,875,108 A | 2/1999 | Hoffberg et al. |
| 5,877,803 A | 3/1999 | Wee et al. |
| 5,913,727 A | 6/1999 | Ahdoot |
| 5,933,125 A | 8/1999 | Fernie |
| 5,980,256 A | 11/1999 | Carmein |
| 5,989,157 A | 11/1999 | Walton |
| 5,995,649 A | 11/1999 | Marugame |
| 6,005,548 A | 12/1999 | Latypov et al. |
| 6,009,210 A | 12/1999 | Kang |
| 6,054,991 A | 4/2000 | Crane et al. |
| 6,066,075 A | 5/2000 | Poulton |
| 6,072,494 A | 6/2000 | Nguyen |
| 6,073,489 A | 6/2000 | French et al. |
| 6,077,201 A | 6/2000 | Cheng et al. |
| 6,098,458 A | 8/2000 | French et al. |
| 6,100,896 A | 8/2000 | Strohecker et al. |
| 6,101,289 A | 8/2000 | Kellner |
| 6,128,003 A | 10/2000 | Smith et al. |
| 6,130,677 A | 10/2000 | Kunz |
| 6,141,463 A | 10/2000 | Covell et al. |
| 6,147,678 A | 11/2000 | Kumar et al. |
| 6,152,856 A | 11/2000 | Studor et al. |
| 6,159,100 A | 12/2000 | Smith |
| 6,173,066 B1 | 1/2001 | Peurach et al. |
| 6,181,343 B1 | 1/2001 | Lyons |
| 6,188,777 B1 | 2/2001 | Darrell et al. |
| 6,215,890 B1 | 4/2001 | Matsuo et al. |
| 6,215,898 B1 | 4/2001 | Woodfill et al. |
| 6,226,396 B1 | 5/2001 | Marugame |
| 6,229,913 B1 | 5/2001 | Nayar et al. |
| 6,256,033 B1 | 7/2001 | Nguyen |
| 6,256,400 B1 | 7/2001 | Takata et al. |
| 6,270,414 B2 | 8/2001 | Roelofs |
| 6,283,860 B1 | 9/2001 | Lyons et al. |
| 6,289,112 B1 | 9/2001 | Jain et al. |
| 6,299,308 B1 | 10/2001 | Voronka et al. |
| 6,308,565 B1 | 10/2001 | French et al. |
| 6,316,934 B1 | 11/2001 | Amorai-Moriya et al. |
| 6,363,160 B1 | 3/2002 | Bradski et al. |
| 6,384,819 B1 | 5/2002 | Hunter |
| 6,411,744 B1 | 6/2002 | Edwards |
| 6,430,997 B1 | 8/2002 | French et al. |
| 6,476,834 B1 | 11/2002 | Doval et al. |
| 6,496,598 B1 | 12/2002 | Harman |
| 6,503,195 B1 | 1/2003 | Keller et al. |
| 6,539,931 B2 | 4/2003 | Trajkovic et al. |
| 6,570,555 B1 | 5/2003 | Prevost et al. |
| 6,633,294 B1 | 10/2003 | Rosenthal et al. |
| 6,640,202 B1 | 10/2003 | Dietz et al. |
| 6,661,918 B1 | 12/2003 | Gordon et al. |
| 6,681,031 B2 | 1/2004 | Cohen et al. |
| 6,714,665 B1 | 3/2004 | Hanna et al. |
| 6,731,799 B1 | 5/2004 | Sun et al. |
| 6,738,066 B1 | 5/2004 | Nguyen |
| 6,765,726 B2 | 7/2004 | French et al. |
| 6,788,809 B1 | 9/2004 | Grzeszczuk et al. |
| 6,801,637 B2 | 10/2004 | Voronka et al. |
| 6,873,723 B1 | 3/2005 | Aucsmith et al. |
| 6,876,496 B2 | 4/2005 | French et al. |
| 6,937,742 B2 | 8/2005 | Roberts et al. |
| 6,950,534 B2 | 9/2005 | Cohen et al. |
| 7,003,134 B1 | 2/2006 | Covell et al. |
| 7,036,094 B1 | 4/2006 | Cohen et al. |
| 7,038,855 B2 | 5/2006 | French et al. |
| 7,039,676 B1 | 5/2006 | Day et al. |
| 7,042,440 B2 | 5/2006 | Pryor et al. |
| 7,050,606 B2 | 5/2006 | Paul et al. |
| 7,058,204 B2 | 6/2006 | Hildreth et al. |
| 7,060,957 B2 | 6/2006 | Lange et al. |
| 7,113,918 B1 | 9/2006 | Ahmad et al. |
| 7,121,946 B2 | 10/2006 | Paul et al. |
| 7,170,492 B2 | 1/2007 | Bell |
| 7,184,048 B2 | 2/2007 | Hunter |
| 7,202,898 B1 | 4/2007 | Braun et al. |
| 7,222,078 B2 | 5/2007 | Abelow |
| 7,227,526 B2 | 6/2007 | Hildreth et al. |
| 7,259,747 B2 | 8/2007 | Bell |
| 7,308,112 B2 | 12/2007 | Fujimura et al. |
| 7,317,836 B2 | 1/2008 | Fujimura et al. |
| 7,348,963 B2 | 3/2008 | Bell |
| 7,359,121 B2 | 4/2008 | French et al. |
| 7,367,887 B2 | 5/2008 | Watabe et al. |
| 7,379,563 B2 | 5/2008 | Shamaie |
| 7,379,566 B2 | 5/2008 | Hildreth |
| 7,389,591 B2 | 6/2008 | Jaiswal et al. |
| 7,412,077 B2 | 8/2008 | Li et al. |
| 7,421,093 B2 | 9/2008 | Hildreth et al. |
| 7,430,312 B2 | 9/2008 | Gu |
| 7,436,496 B2 | 10/2008 | Kawahito |
| 7,450,736 B2 | 11/2008 | Yang et al. |
| 7,452,275 B2 | 11/2008 | Kuraishi |
| 7,460,690 B2 | 12/2008 | Cohen et al. |
| 7,489,812 B2 | 2/2009 | Fox et al. |
| 7,536,032 B2 | 5/2009 | Bell |
| 7,555,142 B2 | 6/2009 | Hildreth et al. |
| 7,560,701 B2 | 7/2009 | Oggier et al. |
| 7,570,805 B2 | 8/2009 | Gu |
| 7,574,020 B2 | 8/2009 | Shamaie |
| 7,576,727 B2 | 8/2009 | Bell |
| 7,590,262 B2 | 9/2009 | Fujimura et al. |
| 7,593,552 B2 | 9/2009 | Higaki et al. |
| 7,598,942 B2 | 10/2009 | Underkoffler et al. |
| 7,607,509 B2 | 10/2009 | Schmiz et al. |
| 7,620,202 B2 | 11/2009 | Fujimura et al. |
| 7,668,340 B2 | 2/2010 | Cohen et al. |
| 7,680,298 B2 | 3/2010 | Roberts et al. |
| 7,683,954 B2 | 3/2010 | Ichikawa et al. |
| 7,684,592 B2 | 3/2010 | Paul et al. |
| 7,701,439 B2 | 4/2010 | Hillis et al. |
| 7,702,130 B2 | 4/2010 | Im et al. |
| 7,704,135 B2 | 4/2010 | Harrison, Jr. |
| 7,710,391 B2 | 5/2010 | Bell et al. |
| 7,725,547 B2 | 5/2010 | Albertson et al. |
| 7,729,530 B2 | 6/2010 | Antonov et al. |
| 7,746,345 B2 | 6/2010 | Hunter |
| 7,760,182 B2 | 7/2010 | Ahmad et al. |
| 7,809,167 B2 | 10/2010 | Bell |
| 7,834,846 B1 | 11/2010 | Bell |

(56) References Cited

U.S. PATENT DOCUMENTS

| | | | |
|---|---|---|---|
| 7,852,262 | B2 | 12/2010 | Namineni et al. |
| RE42,256 | E | 3/2011 | Edwards |
| 7,898,522 | B2 | 3/2011 | Hildreth et al. |
| 8,035,612 | B2 | 10/2011 | Bell et al. |
| 8,035,614 | B2 | 10/2011 | Bell et al. |
| 8,035,624 | B2 | 10/2011 | Bell et al. |
| 8,072,470 | B2 | 12/2011 | Marks |
| 8,136,038 | B2 * | 3/2012 | Ross et al. .......... 715/706 |
| 2008/0024511 | A1 * | 1/2008 | Biehn et al. .......... 345/582 |
| 2008/0026838 | A1 | 1/2008 | Dunstan et al. |
| 2009/0271821 | A1 | 10/2009 | Zalewski |
| 2010/0053151 | A1 | 3/2010 | Marti et al. |
| 2010/0306685 | A1 | 12/2010 | Giaimo, III et al. |
| 2011/0035666 | A1 | 2/2011 | Geisner et al. |

FOREIGN PATENT DOCUMENTS

| | | |
|---|---|---|
| JP | 08044490 A1 | 2/1996 |
| WO | 93/10708 A1 | 6/1993 |
| WO | 97/17598 A1 | 5/1997 |
| WO | 99/44698 A1 | 9/1999 |

OTHER PUBLICATIONS

Miyagawa et al., "CCD-Based Range Finding Sensor", Oct. 1997, pp. 1648-1652, vol. 44 No. 10, IEEE Transactions on Electron Devices.

Rosenhahn et al., "Automatic Human Model Generation", 2005, pp. 41-48, University of Auckland (CITR), New Zealand.

Aggarwal et al., "Human Motion Analysis: A Review", IEEE Nonrigid and Articulated Motion Workshop, 1997, University of Texas at Austin, Austin, TX.

Shao et al., "An Open System Architecture for a Multimedia and Multimodal User Interface", Aug. 24, 1998, Japanese Society for Rehabilitation of Persons with Disabilities (JSRPD), Japan.

Kohler, "Special Topics of Gesture Recognition Applied in Intelligent Home Environments", In Proceedings of the Gesture Workshop, 1998, pp. 285-296, Germany.

Kohler, "Vision Based Remote Control in Intelligent Home Environments", University of Erlangen-Nuremberg/Germany, 1996, pp. 147-154, Germany.

Kohler, "Technical Details and Ergonomical Aspects of Gesture Recognition applied in Intelligent Home Environments", 1997, Germany.

Hasegawa et al., "Human-Scale Haptic Interaction with a Reactive Virtual Human in a Real-Time Physics Simulator", Jul. 2006, vol. 4, No. 3, Article 6C, ACM Computers in Entertainment, New York, NY.

Qian et al., "A Gesture-Driven Multimodal Interactive Dance System", Jun. 2004, pp. 1579-1582, IEEE International Conference on Multimedia and Expo (ICME), Taipei, Taiwan.

Zhao, "Dressed Human Modeling, Detection, and Parts Localization", 2001, The Robotics Institute, Carnegie Mellon University, Pittsburgh, PA.

He, "Generation of Human Body Models", Apr. 2005, University of Auckland, New Zealand.

Isard et al., "Condensation—Conditional Density Propagation for Visual Tracking", 1998, pp. 5-28, International Journal of Computer Vision 29(1), Netherlands.

Livingston, "Vision-based Tracking with Dynamic Structured Light for Video See-through Augmented Reality", 1998, University of North Carolina at Chapel Hill, North Carolina, USA.

Wren et al., "Pfinder: Real-Time Tracking of the Human Body", MIT Media Laboratory Perceptual Computing Section Technical Report No. 353, Jul. 1997, vol. 19, No. 7, pp. 780-785, IEEE Transactions on Pattern Analysis and Machine Intelligence, Caimbridge, MA.

Breen et al., "Interactive Occlusion and Collusion of Real and Virtual Objects in Augmented Reality", Technical Report ECRC-95-02, 1995, European Computer-Industry Research Center GmbH, Munich, Germany.

Freeman et al., "Television Control by Hand Gestures", Dec. 1994, Mitsubishi Electric Research Laboratories, TR94-24, Caimbridge, MA.

Hongo et al., "Focus of Attention for Face and Hand Gesture Recognition Using Multiple Cameras", Mar. 2000, pp. 156-161, 4th IEEE International Conference on Automatic Face and Gesture Recognition, Grenoble, France.

Pavlovic et al., "Visual Interpretation of Hand Gestures for Human-Computer Interaction: A Review", Jul. 1997, pp. 677-695, vol. 19, No. 7, IEEE Transactions on Pattern Analysis and Machine Intelligence.

Azarbayejani et al., "Visually Controlled Graphics", Jun. 1993, Vol. 15, No. 6, IEEE Transactions on Pattern Analysis and Machine Intelligence.

Granieri et al., "Simulating Humans in VR", The British Computer Society, Oct. 1994, Academic Press.

Brogan et al., "Dynamically Simulated Characters in Virtual Environments", Sep./Oct. 1998, pp. 2-13, vol. 18, Issue 5, IEEE Computer Graphics and Applications.

Fisher et al., "Virtual Environment Display System", ACM Workshop on Interactive 3D Graphics, Oct. 1986, Chapel Hill, NC.

"Virtual High Anxiety", Tech Update, Aug. 1995, pp. 22.

Sheridan et al., "Virtual Reality Check", Technology Review, Oct. 1993, pp. 22-28, vol. 96, No. 7.

Stevens, "Flights into Virtual Reality Treating Real World Disorders", The Washington Post, Mar. 27, 1995, Science Psychology, 2 pages.

"Simulation and Training", 1994, Division Incorporated.

Taniguchi, et al., "Perceptual User Interface by Human Body Action", Retrieved at <<https://qir.kyushu-u.ac.jp/dspace/bitstream/2324/5956/1/TaniguchiIWMMSS04.pdf>>, In the Proceedings of 2nd International Workshop on Man-Machine Symbiotic Systems, Nov. 2004, pp. 1-12.

* cited by examiner

THREE-DIMENSIONAL GESTURE CONTROLLED AVATAR CONFIGURATION INTERFACE

BACKGROUND

Motion control is now widely used in computer gaming and other computing applications. In computer games, sensed motion may be used to control gameplay. For example, accelerometers and/or gyroscopes in smart phones can be used to control turning of a vehicle in a driving/racing game. Full-body motion capture is used in other settings, to aid in computer animation or to control gameplay within a video game. Although use of motion can enhance these experiences, the process of configuring and initiating the experience provided by the software is typically achieved through use of unnatural and non-intuitive user interfaces, such as use of a simple 2D cursor to select gameplay options.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method for controlling presentation to a user of a primary user experience of a software application is provided. The method includes displaying a third-person avatar in a 3D virtual scene that defines a user interface for controlling presentation of the primary user experience. The method further includes sensing controlling movements of the user within a physical space in which the user is located and causing display of controlled movements of the third-person avatar within the 3D virtual scene so that the controlled movements visually replicate the controlling movements. The method further includes detecting a predefined interaction of the third-person avatar with a user interface element displayed in the 3D virtual scene, and controlling presentation of the primary user experience in response to detecting the predefined interaction.

DETAILED DESCRIPTION

The disclosure is directed to systems and methods in which motion is used to control a third-person avatar in order to configure, initialize and/or control startup and other aspects of a primary software experience. As used herein, "primary software experience" refers to the ultimate software application, or portion of an application, which the user wants to use, play, etc. The disclosure is directed to a user interface that is natural, intuitive and controlled through motion-sensed gestures and movement, and which executes separate from and external to the primary user experience. In some cases, this user interface will be referred to as a "startup interface" or "configuration interface."

As an initial non-limiting example, a gaming console and associated depth camera can yield a 3D virtual scene or other displayed scene in which motions of a player are detected to yield corresponding motions in an on-screen avatar shown in the displayed scene. The avatar is a third-person avatar, in the sense that it is displayed to the user so that it is clear that the avatar has a different field of view than the user (i.e., the "eyes" of the avatar and those of the user are not co-located). By providing this separation of the field of view, the user receives higher-quality feedback showing how the user's movements affect the movement of the third-person avatar. This can be extremely and unexpectedly beneficial when the avatar motions are used to select and otherwise interact with virtual objects displayed in 3D virtual user-interface scenes. More specifically, enhanced feedback may be realized in user interface virtual scenes in which avatar movements are interpreted to configure, startup, initialize, etc., primary user experiences.

Figure 1:
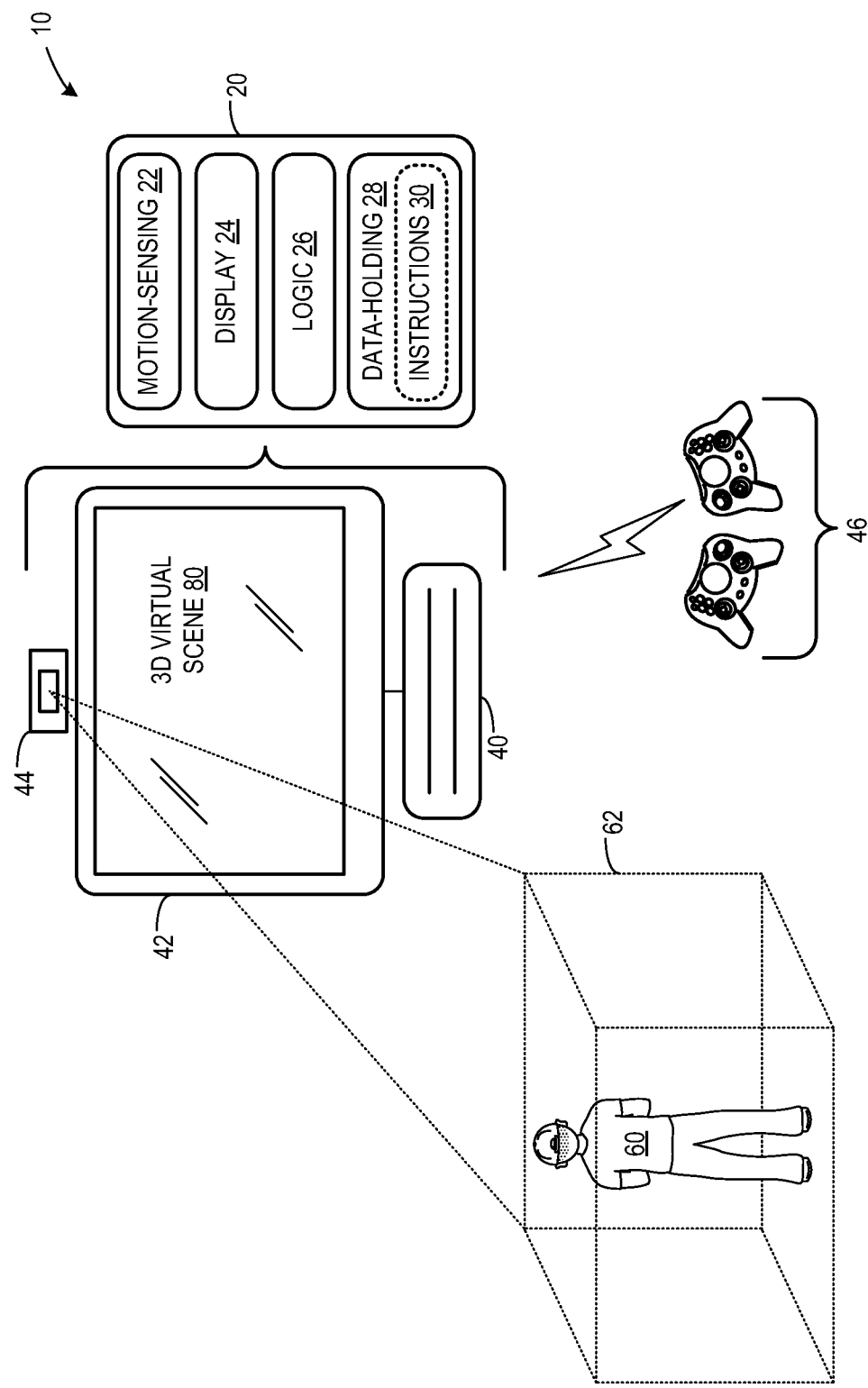
FIG. 1 schematically shows an example motion sensing system in accordance with a preferred embodiment of the present disclosure.

FIG. 1 depicts a system 10 in which motion sensing is used to control a third-person avatar so that controlled movements of the avatar correspond visually to the controlling movements of the user. In the depicted example, computing system 20 has motion-sensing subsystem 22; a display subsystem 24; a logic subsystem 26; and a data-holding subsystem 28 containing instructions 30 that are executable by the logic subsystem (e.g., a microprocessor). As will be explained in detail below, the instructions may be executed to carry out motion-based control of a third-person avatar, so as to provide a user interface in which natural gestures and other motion control the setup, startup, initialization, etc. of a primary user experience. Virtually any aspect of a primary user experience can be controlled via the user interface examples discussed herein.

In the example of FIG. 1, computing system 20 is a gaming system in which data-holding and logic/processing features are incorporated into gaming console 40, which is operatively interconnected with a high-definition television (HDTV) display 42 and motion sensor in the form of depth camera 44. A nearly limitless variety of other components may be used in connection with gaming console 40. For example, gaming console 40 may be coupled with peripheral gaming components such as controllers 46. Although a depth camera is shown in the present example, a variety of other motion-sensing technologies may be employed without departing from the spirit of the disclosure. As non-limiting examples, an accelerometer, a gyroscope, stereo vision, active marker tracking, and/or passive marker tracking technologies may be employed.

Depth camera 44 is configured to track position and motion of a target 60 (e.g., a human user) within a capture volume 62 in real-time. This yields a dynamically-changing motion input which is processed to create a dynamically-changing 3D spatial model associated with target 60. The 3D spatial model, in turn, is used to control computing system 20, for example by controlling motion of a third-person avatar within a 3D virtual scene 80 on HDTV 42. For example, motion of a human user could be used to control movement of a third-person avatar in a virtual reality scene. It will be appreciated that while capture volume 62 is shown as a cube, that other geometries are possible without departing from the scope of this disclosure. As one non-limiting example, the capture volume may be a frustum.

Aspects of this disclosure will now be described by example and with reference to various embodiments. Components, process steps, and other elements that may be substantially the same in one or more embodiments are identified coordinately and are described with minimal repetition. It will be noted, however, that elements identified coordinately may also differ to some degree. It will be further noted that the drawings included herein are schematic and generally not drawn to scale. Rather, the various drawing scales, aspect ratios, and numbers of components shown in the figures may be purposely distorted to make certain features or relationships easier to see.

Before turning to more specific examples, a general method for controlling a software application that provides a user with a primary user experience will be described. An example of such a method is shown at 200 in FIG. 2. At 202, the method includes displaying a third-person avatar in a 3D virtual scene that defines a user interface for controlling presentation of the primary user experience. At 204, the method includes sensing controlling movements of the user within a physical space in which the user is located. At 206, the method includes causing display of controlled movements of the third-person avatar within the 3D virtual scene so that the controlled movements visually replicate the controlling movements. At 208, the method includes detecting that the controlled movements include a predefined interaction of the third-person avatar with a user interface element displayed in the 3D virtual scene. At 210, the method includes controlling presentation of the primary user experience in response to detecting the predefined interaction. Although this method will be at times described in connection with the computing system of FIG. 1, it will be appreciated that the method may be performed in connection with a nearly limitless variety of other particularized machines, in addition to or instead of the one shown in FIG. 1. In one example, the exemplary methods may be carried out via execution of instructions such as those shown at 30 in FIG. 1.

Figure 3:
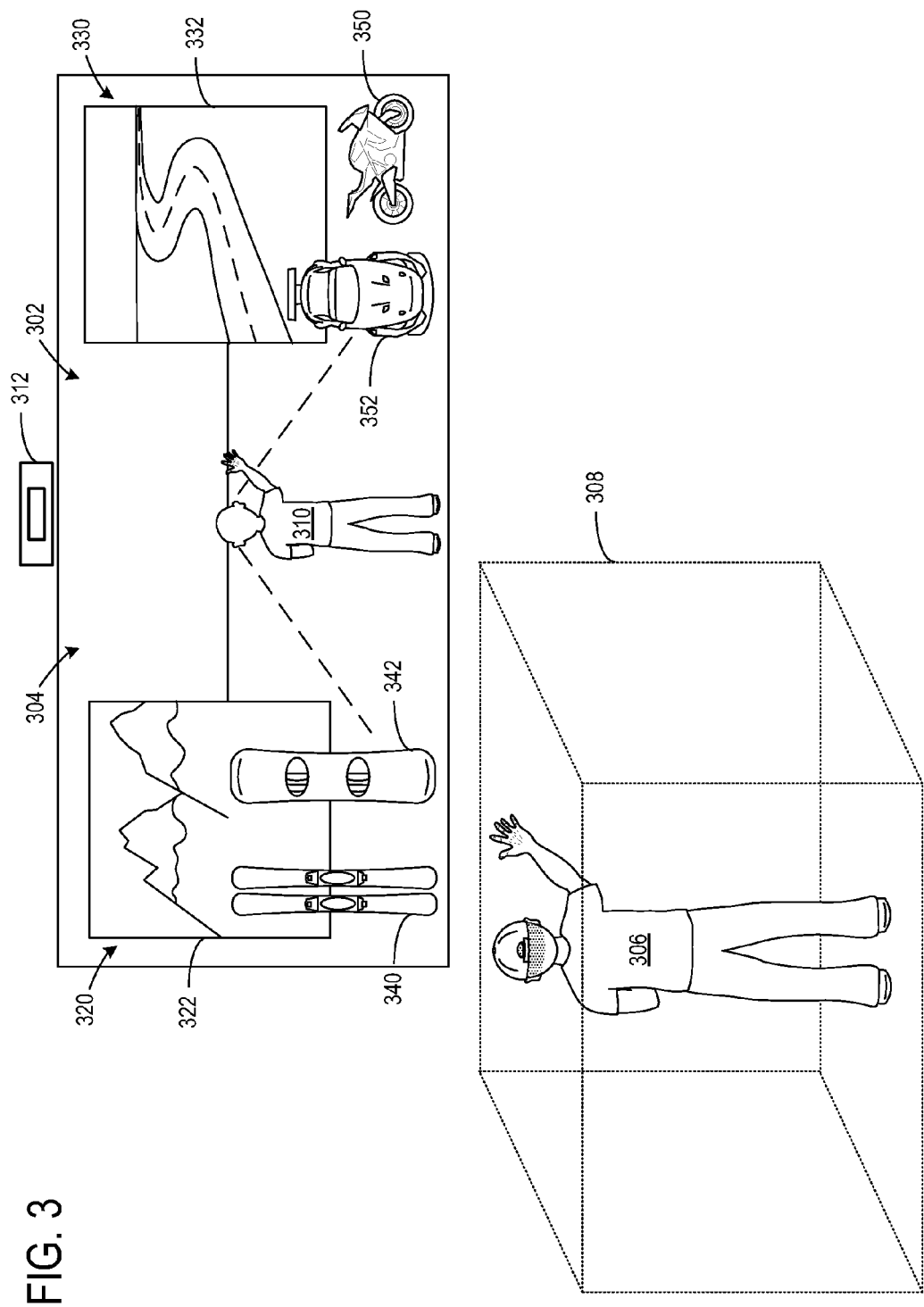
FIG. 3 schematically shows an example user interface associated with the system of FIG. 1.
Figure 4:
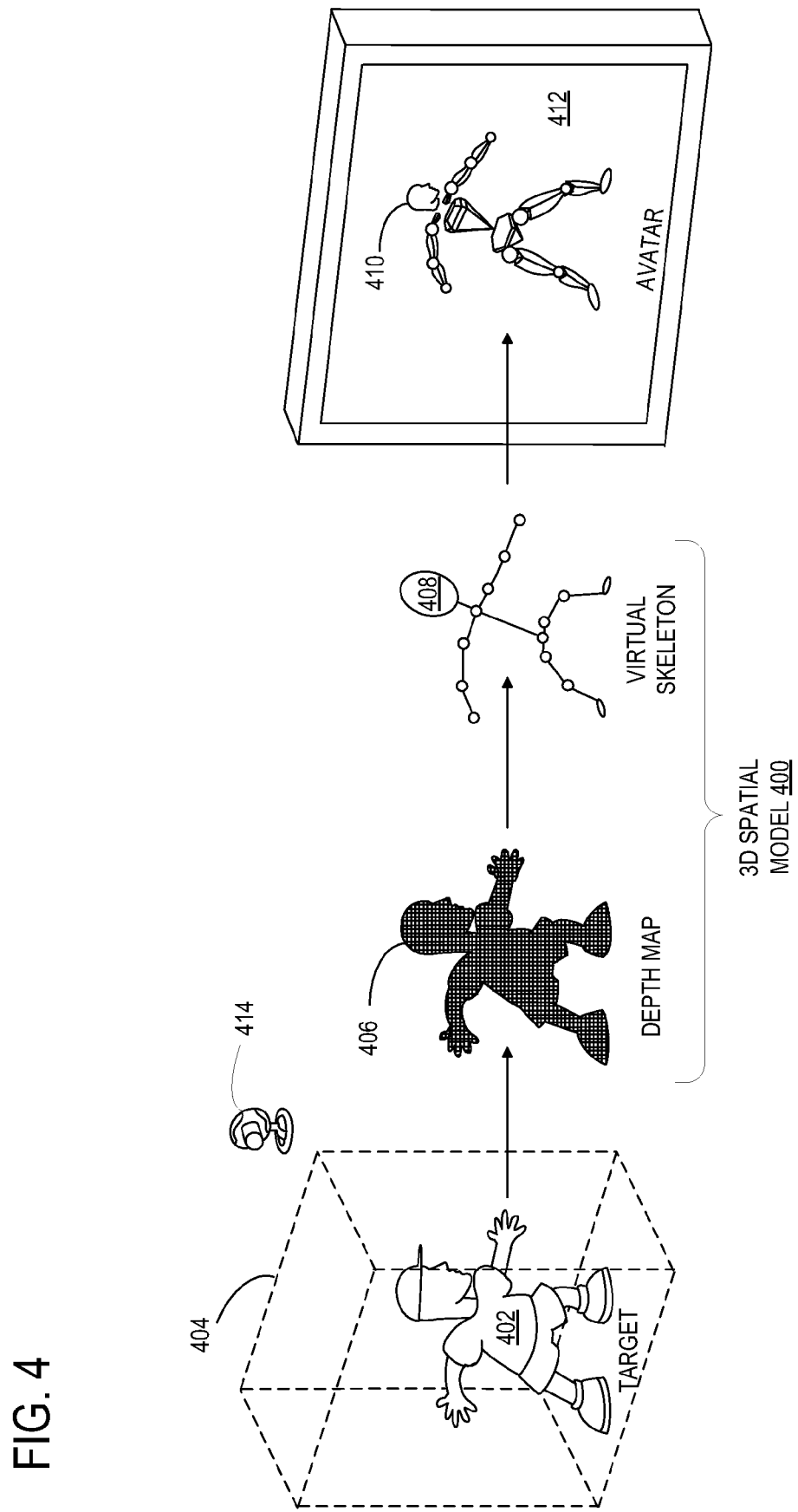
FIG. 4 schematically shows an example pipeline to generate an avatar from a human target using the system of FIG. 1.
Figure 5:
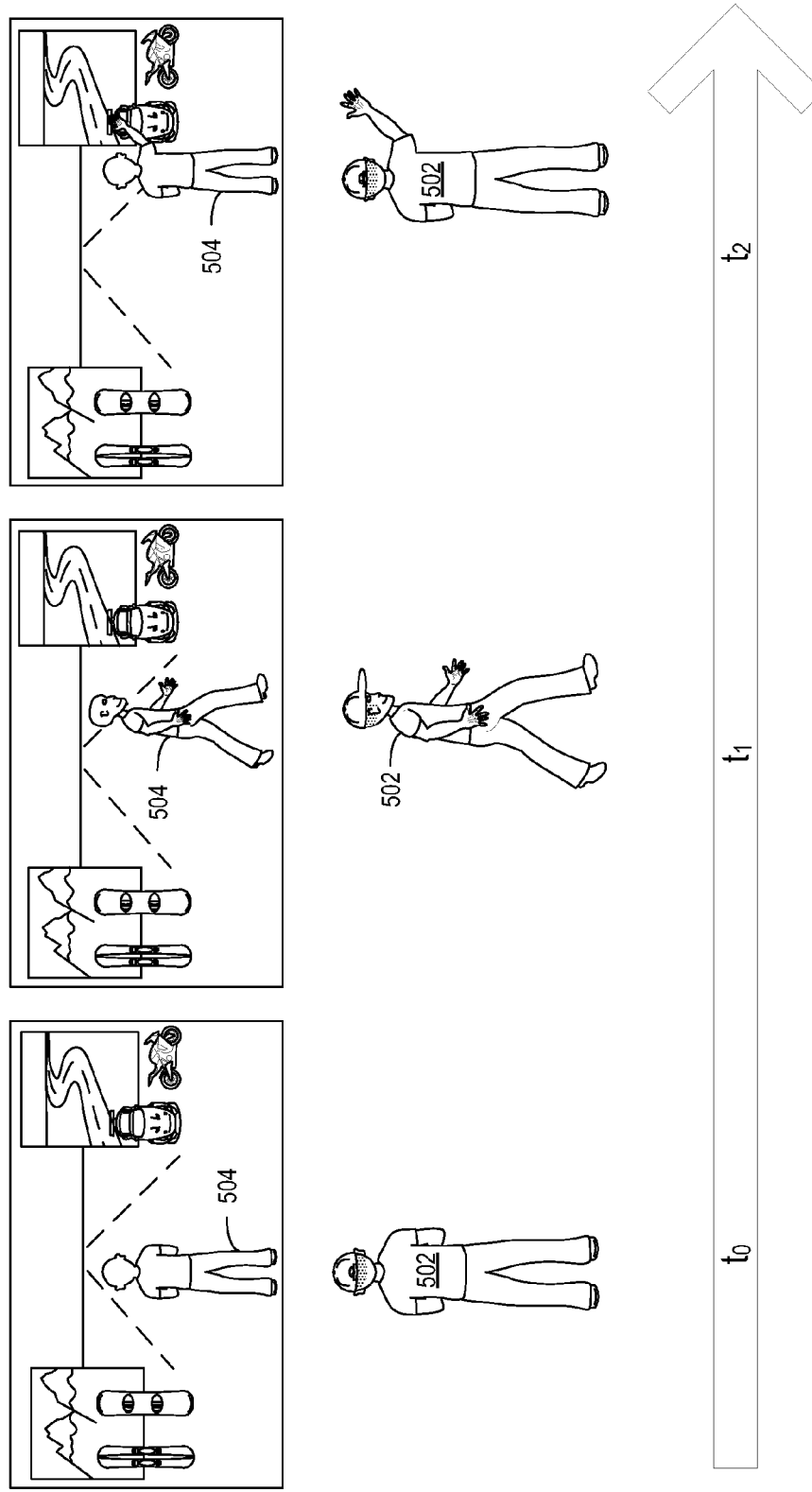
FIG. 5 schematically shows an example timeline of a human target controlling aspects of the system of FIG. 1.

FIG. 3 depicts a user interface 302 defined by 3D virtual scene 304. Depicted within the scene is a third-person avatar 310, whose movements are controlled based on movements of human user 306 within capture volume 308 (as detected by depth camera 312). Referring briefly to FIGS. 4 and 5, the movement of user 306 may be tracked optically and in real time to generate a dynamic 3D spatial model 400. Changes to the model which occur as the user moves are processed to produce corresponding control so that the third-person avatar moves in the same way as the human user.

FIG. 4 shows a simplified processing pipeline in which target 402 in capture volume 404 is modeled as a virtual skeleton 408 that can be used to draw an avatar 410 on display device 412 and/or serve as a control input for controlling other aspects of a game, application, and/or operating system. It will be appreciated that a processing pipeline may include additional steps and/or alternative steps than those depicted in FIG. 2 without departing from the scope of this disclosure.

As shown in FIG. 4, target 402 and the rest of capture volume 404 may be imaged by a capture device such as depth camera 414. The depth camera may determine, for each pixel, the depth of a surface in the capture volume relative to the depth camera. Virtually any depth finding technology may be used without departing from the scope of this disclosure.

The depth information determined for each pixel may be used to generate a depth map 406. Such a depth map may take the form of virtually any suitable data structure, including but not limited to a matrix that includes a depth value for each pixel of the observed scene. In FIG. 4, depth map 406 is schematically illustrated as a pixelated grid of the silhouette of target 402. This illustration is for simplicity of understanding, not technical accuracy. It is to be understood that a depth map generally includes depth information for all pixels, not just pixels that image target 402 (e.g., depth information of a world space that the target occupies), and that the perspective of depth camera 414 would not result in the silhouette depicted in FIG. 4. Further, depth information may be processed such that the target depth information is segmented from the world space depth information. However it will be appreciated that in some embodiments the target depth information may be mixed with the world space depth information.

Virtual skeleton 408 may be derived from depth map 406 to provide a machine readable representation of target 402. In other words, virtual skeleton 408 is derived from depth map 406 to model target 402. The virtual skeleton 408 may be derived from the depth map in any suitable manner. In some embodiments, one or more skeletal fitting algorithms may be applied to the depth map. The present disclosure is compatible with virtually any skeletal modeling techniques.

The virtual skeleton 408 may include a plurality of joints, each joint corresponding to a portion of the target. In FIG. 4, virtual skeleton 408 is illustrated as a fifteen-joint stick figure. This illustration is for simplicity of understanding, not technical accuracy. Virtual skeletons in accordance with the present disclosure may include virtually any number of joints, each of which can be associated with virtually any number of parameters (e.g., three dimensional joint position, joint rotation, body posture of corresponding body part (e.g., hand open, hand closed, etc.) etc.). It is to be understood that a virtual skeleton may take the form of a data structure including one or more parameters for each of a plurality of skeletal joints (e.g., a joint matrix including an x position, a y position, a z position, and a rotation for each joint). In some embodiments, other types of virtual skeletons may be used (e.g., a wireframe, a set of shape primitives, etc.).

As shown in FIG. 4, an avatar 410 may be rendered on display device 412 as a visual representation of virtual skeleton 408. Because virtual skeleton 408 models target 402, and the rendering of the avatar 410 is based on the virtual skeleton 408, the avatar 410 serves as a viewable digital representation of the target 402. As such, movement of avatar 410 on display device 412 reflects the movements of target 402.

For example, FIG. 5 schematically shows a human target 502 at different moments in time (e.g., time $t_0$, time $t_1$, and time $t_2$). As discussed above, third-person avatar 504 may reflect the movements of human target 502. As such, movement and/or gestures of the modeled human target may be interpreted as different controls for controlling the computing system.

As an example, FIG. 5 shows human target 502 in a neutral position at time $t_0$. Since third-person avatar 504 corresponds to human target 502 at time $t_0$, third-person avatar 504 is also shown in a neutral position. At time $t_1$, human target 502 walks to the right. Likewise, third-person avatar 504 walks to the right. At time $t_2$, the human target 502 raises a right arm and in response third-person avatar 504 raises a right arm. Such a movement may correspond to a user selecting a game control. In the example shown, at time $t_2$ human target 502 controls a motor sports game by selecting a race car. In this way, a game player may launch the motor sports game using the selected race car as a chosen vehicle as opposed to the unselected motorcycle.

It will be appreciated that FIG. 5 is shown by way of example and other movements and/or gestures are possible without departing from the scope of this disclosure. As a non-limiting example, a game player may select a feature of a game by reaching for a virtual element using a third-person avatar and clenching a first to confirm the selection.

Referring again to FIG. 3, user interface 302 may be employed to initialize, configure, select, start, etc., a primary user experience. Two primary user experiences are available in the present example: (1) a mountain sports game; and (2) a motor sports game. One example of user interface control is the starting or selecting of one of the primary user experiences in response to avatar movement. For example, the avatar may approach the mountain sports portion 320 of the scene. In response to this avatar interaction with a virtual element (i.e., approach toward a user interface element in the form of poster-type display 322 representing the mountain sports game), the primary user experience may launch (e.g., starting a gameplay sequence of skiing or snowboarding). Similarly, approaching a user interface element 332 of motor sports portion 330 may be inferred to interpret intent to launch a driving game. Instead of approaching the user interface element, intent may be inferring from natural gestures of the human user and avatar, such as pointing toward, reaching for, etc. a user interface element.

Avatar interaction with the user interface and virtual elements therein may also be used to configure options associated with the primary user experience. For example, if the avatar touches or approaches or reaches for skis 340 or snowboard 342, the launched primary user experience may be a skiing gameplay sequence or snowboarding gameplay sequence, respectively. The motor sports experience may similarly be affected by whether avatar interacts with (e.g., reaches for, walks toward, points to, etc.) motorcycle 350 or race car 352.

Figure 2:
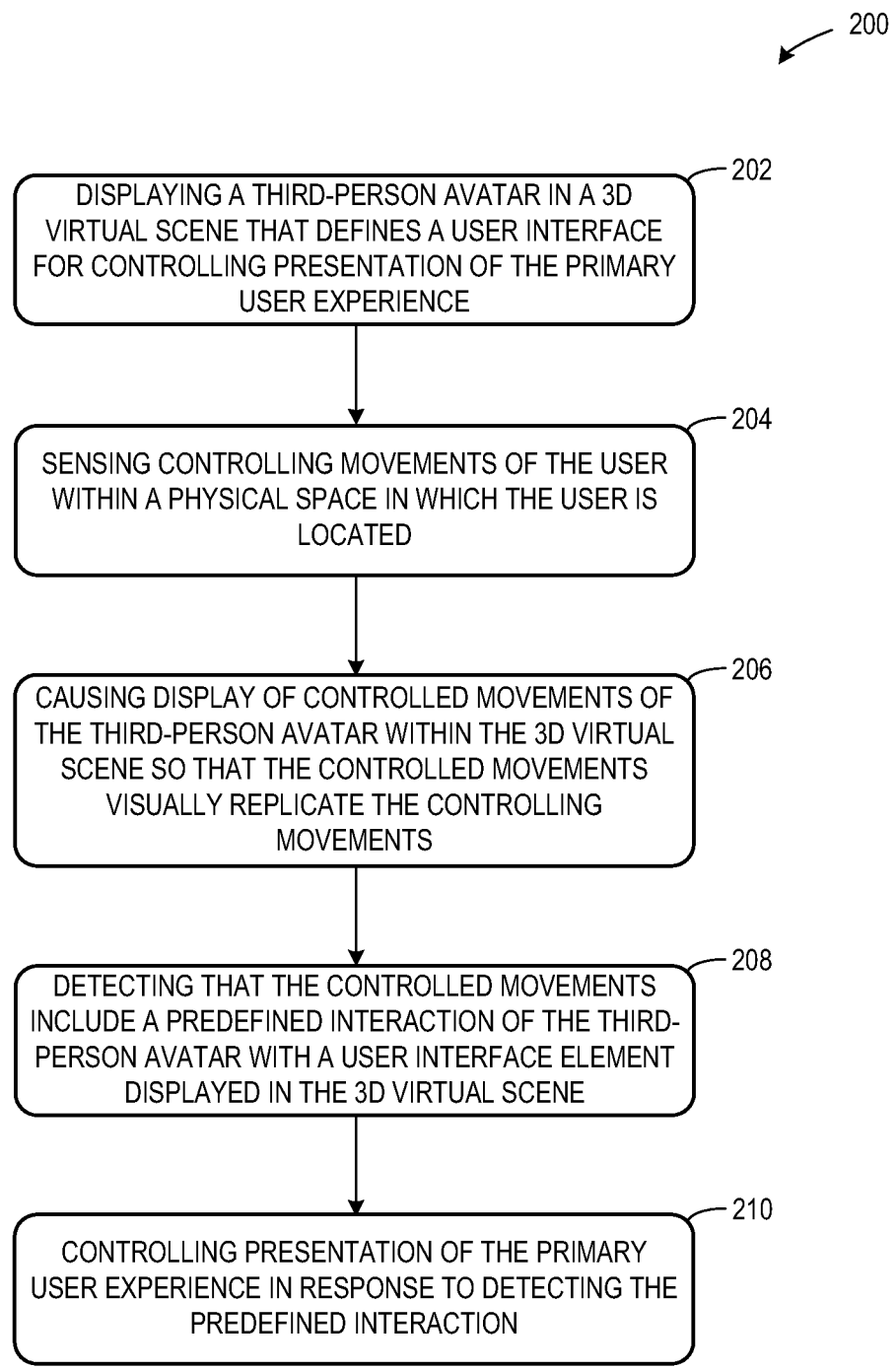
FIG. 2 illustrates an example method for controlling a software application using the system of FIG. 1.

Referring again to method 200 of FIG. 2, it will be appreciated that the various steps may be performed in a variety of ways. Referring to step 208, the systems and methods may include a mapping of predefined user/avatar movements with operations of the user interface. As user motion is tracked (e.g., through optical real-time generation of a 3D spatial model), the tracked motion may be examined to determine whether it includes any predefined movements which correspond to a user interface operation. For example, when the user moves within the capture volume so as to cause the avatar to walk toward a displayed element in the 3D virtual scene, user intent to select that element may be inferred from the avatar coming within a predetermined "radius" or distance from the displayed element.

In some embodiments, the above-described methods and processes may be tied to a computing system including one or more computers. In particular, the methods and processes described herein may be implemented as a computer application, computer service, computer API, computer library, and/or other computer program product.

As discussed above, FIG. 1 schematically shows a nonlimiting example of a computing system that can carry out the avatar-based user interface systems/methods discussed herein. Although FIG. 1 shows a gaming-console example, it is to be understood that virtually any computer architecture may be used without departing from the scope of this disclosure. In alternate embodiments, the computing system may take the form of a mainframe computer, server computer, desktop computer, laptop computer, tablet computer, home entertainment computer, network computing device, mobile computing device, mobile communication device, etc.

As indicated in FIG. 1, the example computing system includes a logic subsystem and a data-holding subsystem. The computing system may also include a display subsystem, communication subsystem, and/or other components not shown in FIG. 1. The system may also optionally include user input devices such as keyboards, mice, game controllers, cameras, microphones, and/or touch screens, for example.

The logic subsystem may include one or more physical devices configured to execute one or more instructions. For example, the logic subsystem may be configured to execute one or more instructions (e.g., the described user interface instructions) that are part of one or more applications, services, programs, routines, libraries, objects, components, data structures, or other logical constructs. Such instructions may be implemented to perform a task, implement a data type, transform the state of one or more devices, or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more devices, which may be remotely located and/or configured for coordinated processing. One or more aspects of the logic subsystem may be virtualized and executed by remotely accessible networked computing devices configured in a cloud computing configuration.

The data-holding subsystem may include one or more physical, non-transitory, devices configured to hold data and/or instructions executable by the logic subsystem to implement the herein described methods and processes. When such methods and processes are implemented, the state of data-holding subsystem may be transformed (e.g., to hold different data).

The data-holding subsystem may include removable media and/or built-in devices. The data-holding subsystem may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others. The data-holding subsystem may include devices with one or more of the following characteristics: volatile, nonvolatile, dynamic, static, read/write, read-only, random access, sequential access, location addressable, file addressable, and content addressable. In some embodiments, the logic subsystem and data-holding subsystem may be integrated into one or more common devices, such as a gaming console, application specific integrated circuit or a system on a chip.

The data-holding subsystem may include removable computer-readable storage media, which may be used to store and/or transfer data and/or instructions executable to implement the herein described methods and processes. The removable computer-readable storage media may take the form of CDs, DVDs, HD-DVDs, Blu-Ray Discs, EEPROMs, and/or floppy disks, among others.

It is to be appreciated that the data-holding subsystem includes one or more physical, non-transitory devices. In contrast, in some embodiments aspects of the instructions described herein may be propagated in a transitory fashion by a pure signal (e.g., an electromagnetic signal, an optical signal, etc.) that is not held by a physical device for at least a finite duration. Furthermore, data and/or other forms of information pertaining to the present disclosure may be propagated by a pure signal.

The terms "module," "program," and "engine" may be used to describe an aspect of computing system that is implemented to perform one or more particular functions. In some cases, such a module, program, or engine may be instantiated via a logic subsystem executing instructions held by a data-holding subsystem (e.g., instructions 30 stored in data-holding subsystem 28—FIG. 1). It is to be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" are meant to encompass individual or groups of executable files, data files, libraries, drivers, scripts, database records, etc.

It is to be appreciated that a "service", as used herein, may be an application program executable across multiple user sessions and available to one or more system components, programs, and/or other services. In some implementations, a service may run on a server responsive to a request from a client.

When included, a display subsystem may be used to present a visual representation of data held by a data-holding subsystem. As the herein described methods and processes change the data held by the data-holding subsystem, and thus transform the state of the data-holding subsystem, the state of the display subsystem may likewise be transformed to visually represent changes in the underlying data. The display subsystem may include one or more display devices utilizing virtually any type of technology. Such display devices may be combined with a logic subsystem and/or data-holding subsystem in a shared enclosure, or such display devices may be peripheral display devices.

When included, a communication subsystem may be configured to communicatively couple the computing system with one or more other computing devices. The communication subsystem may include wired and/or wireless communication devices compatible with one or more different communication protocols. As nonlimiting examples, the communication subsystem may be configured for communication via a wireless telephone network, a wireless local area network, a wired local area network, a wireless wide area network, a wired wide area network, etc. In some embodiments, the communication subsystem may allow the computing system to send and/or receive messages to and/or from other devices via a network such as the Internet.

It is to be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated may be performed in the sequence illustrated, in other sequences, in parallel, or in some cases omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

The invention claimed is:

1. A method for controlling presentation to a user of a primary user experience of a software application, the method comprising:
    displaying a third-person avatar in a 3D virtual scene that defines a user interface for controlling presentation of the primary user experience, the user interface being external to, different from, and provided at different times than the primary user experience;
    receiving a depth map from a depth camera imaging a physical space in which the user is located, the depth map including a plurality of pixels, each pixel having a depth value that indicates a relative depth of a surface imaged by that pixel;
    deriving from the depth map a virtual skeleton that provides a machine readable representation of the user, the virtual skeleton including a plurality of joints, each joint having a three-dimensional position;
    recognizing controlling movements of the user within the physical space via at least the three-dimensional positions of two or more different joints of the virtual skeleton;
    causing display of controlled movements of the third-person avatar within the 3D virtual scene so that the controlled movements visually replicate the controlling movements;
    detecting that the controlled movements include a predefined interaction of the third-person avatar with a user interface element displayed in the 3D virtual scene, the predefined interaction corresponding to selection of a characteristic to be implemented in connection with delivery of the primary user experience; and
    controlling presentation of the primary user experience in response to and based upon detecting the predefined interaction, such that the primary user experience varies—as a result of the implemented characteristic—from that which would occur in the event of detecting a different predefined interaction.

2. The method of claim 1, wherein controlling presentation of the primary user experience includes causing the primary user experience to be selected for startup from a plurality of different primary user experiences that are selectable via the user interface.

3. The method of claim 1, wherein the predefined interaction with the user interface element is a predefined movement of at least a portion of the third-person avatar toward the user interface element.

4. The method of claim 1, wherein the predefined interaction with the user interface element is a gesture of the third-person avatar in relation to the user interface element.

5. A computing system, comprising,
    a data-holding subsystem and logic subsystem that are operatively interconnected, the data-holding subsystem containing instructions that are executable by the logic subsystem to:
        cause a display subsystem to display a third-person avatar in a 3D virtual scene that defines a user interface for controlling presentation of a primary user experience of a software application that is executable by the logic subsystem, the user interface being external to, different from, and provided at different times than the primary user experience;
        in response to a depth camera imaging a user within a physical space to output a depth map that includes a plurality of pixels, each pixel having a depth value that indicates a relative depth of a surface imaged by that pixel, modeling the user with a virtual skeleton derived from the depth map, the virtual skeleton including a plurality of joints, each joint having a three-dimensional position;

cause the display subsystem to display controlled movements of the third-person avatar so that the controlled movements visually correspond to virtual movements of the virtual skeleton, the controlling movements being based on at least the three-dimensional positions of two or more different joints of the virtual skeleton; and control presentation of the primary user experience in response to the virtual movements of the virtual skeleton.

6. The computing system of claim 5, wherein controlling presentation of the primary user experience includes providing the primary user experience with a particular option that is activated via interpretation of the controlled movements.

7. The computing system of claim 5, wherein the controlled movements of the third-person avatar are one or more of a movement of the third-person avatar toward a user interface element, a pointing of the third-person avatar toward the user interface element, and a touching of the user interface element by the third-person avatar.

8. A method for controlling a software application that provides a user with a primary user experience, the method comprising:

displaying a third-person avatar in a 3D virtual scene that defines a user interface for controlling the primary user experience, the user interface being external to, different from, and provided at different times than the primary user experience;

sensing a controlling movement of the user within a physical space in which the user is located, where such sensing is performed optically and in real-time using a depth camera;

in response to sensing the controlling movement of the user, causing a controlled movement of the third-person avatar within the 3D virtual scene so that the controlled movement visually corresponds to the controlling movement;

determining whether the controlled movement includes a predefined action that selects a virtual object that is displayed within the 3D virtual scene; and if the controlled movement includes the predefined action, controlling the primary user experience to incorporate use of the virtual object in the primary user experience such that the primary user experience varies from that which would occur in the event of the virtual object not being selected, wherein the displaying, sensing, causing of the controlled movement and determining are all performed outside of the primary user experience.

9. The method of claim 8, wherein controlling the primary user experience includes causing it to be selected, for starting, from a plurality of different primary user experiences.

10. The method of claim 8, wherein the user interface includes a plurality of user interface elements that are displayed within the 3D virtual scene, the plurality of user interface elements defining, for the primary user experience, a plurality of options that are each selectable via the controlled movement of the third-person avatar.

11. The method of claim 10, wherein the selection of the user interface element is caused in response to the controlled movement being in a direction within the 3D virtual scene that is toward the user interface element.

12. The method of claim 10, wherein the selection of the user interface element is caused in response to the third-person avatar walking toward the user interface element.

13. The method of claim 10, wherein the selection of the user interface element is caused in response to movement of an arm of the third-person avatar.

* * * * *